Patented Nov. 24, 1942

2,303,136

UNITED STATES PATENT OFFICE 2,303,136

SOLUBLE OIL

Clement L. Perkins, Marion, Conn.

No Drawing. Application October 8, 1940,
Serial No. 360,262

3 Claims. (Cl. 252—312)

The object of my invention is the production of a liquid composition containing a major proportion of kerosene so associated with other ingredients that the kerosene is able to exert its normal solvent effect and other normal effects, but is nevertheless readily miscible with water, so that it can be easily removed from the field of action by washing with water.

My liquid composition is useful as a cleaning agent, as an insecticide, as a lubricant in metal-working operations, and for other purposes.

I prefer to prepare my liquid composition substantially as follows:

Dissolve 40 pounds of pine rosin in 140 pounds of kerosene, heated to promote solution; cool the rosin-in-kerosene solution well below the boiling point of water and add to it, slowly and with constant stirring, a solution of 5 pounds of sodium hydroxide in 12 pounds of water; finally add to the above 6 pounds of oleic acid with constant stirring. The product resulting from the above procedure is a clear, homogeneous, stable liquid. When a little of the product is added to a relatively large volume of water, it disperses readily therein, little or no stirring being required.

The above procedure may be varied by adding the oleic acid to the kerosene or to the rosin-in-kerosene solution before the addition of water and sodium hydroxide. Alkali hydroxides other than sodium hydroxide may be used. Fatty acids other than oleic acid may also be used, such, for example, as stearic and palmitic acids. The proportion of kerosene relative to the other ingredients may be varied somewhat. The proportion of oleic acid relative to the other ingredients may also be increased. It is not necessary to employ purified compounds. Crude oleic acid, or even crude mixed fatty acids, such as can be obtained from soap makers, may be used.

It is not necessary to employ purified kerosene. The term "kerosene" herein used is intended to refer broadly to the fraction of petroleum obtained by distillation, which has a boiling range intermediate between that of the lower boiling gasoline fraction and that of the higher boiling lubricating oil fraction. The kerosene may contain moderate proportions of the gasoline fraction and also moderate proportions of the lubricating oil fraction without departing from the spirit of my invention. However, a liquid consisting largely of that fraction of petroleum ordinarily known as kerosene is preferred, since it has the favorable characteristics of low viscosity and great ability to dissolve grease and has at the same time substantially no explosion hazard.

The term "fatty acids," as used herein, is employed in the industrial sense rather than in the strictly scientific sense. When an industrial user speaks of "fatty acids," he means primarily stearic, oleic and palmitic acids. This usage extends also to publications devoted to the industrial use of fatty acids. It is this group of acids, either individually or in combination, that I have found to be effective in preparing my liquid composition. It will be noted that these fatty acids are capable of forming soaps. They may, therefore, be referred to as soap-forming fatty acids although their action in the present invention does not appear to depend necessarily upon their power to form soaps.

The function of the oleic acid or other fatty acid in the above described liquid composition is to make the water phase and the kerosene phase miscible. In the absence of a fatty acid, the water phase and the kerosene phase tend to remain as distinct layers even after vigorous stirring. When, however, a sufficient quantity of fatty acid is added to the mixture, and the mixture is stirred, the water phase enters the kerosene phase in a state of extreme dispersion therein. The state of dispersion is so extreme that the liquid composition is clear and transparent. Such compositions are popularly known as soluble oils. In performing this function, the fatty acid appears to act substantially entirely by its mere presence rather than as the result of any chemical reaction in which it takes part. This follows from the fact that the fatty acid is effective in performing its function when the rosin and the alkali hydroxide are used in substantially equivalent proportions and have had ample opportunity to react prior to the addition of the fatty acid. A certain minimum proportion of fatty acid is required to perform this function. This minimum proportion may vary somewhat with variations in the proportions and quality of the other ingredients, but the amount required in any case is easily ascertainable by observation of the batch to which it is being added. Quantities of fatty acid in excess of this minimum may be used without substantial harm to my liquid composition, but these additional quantities do not contribute substantially to the usefulness of the said liquid composition. On the other hand, they do increase its cost since the fatty acid is normally the most costly ingredient entering into my liquid composition.

As hereinbefore stated, my liquid composition is useful as a cleaning agent. When used as a cleaning agent, its first action is similar to that of kerosene itself in that it wets greasy surfaces, dissolves the grease and liberates the solid particles of dirt which may be present. After my liquid composition has performed these functions, it can readily be removed from the field of action by treatment with water. For example, it may be flushed off with a hose, mopped up, or the article to be cleaned may be immersed in water. It will thus be seen that, while my liquid composition behaves like kerosene itself in dissolving grease, it has the great advantage over kerosene that it can be removed, readily and completely from the field of action. During the process of removal, when my liquid composition is diluted with water, the sodium resinate present therein dissolves in the water of dilution and assists in the cleaning action by causing the solid dirt particles to be dispersed and to tend to remain in suspension. The detergent effect of the sodium resinate is thus added to the grease-dissolving effect of the kerosene.

My liquid composition has been found useful as a cleaning agent in such varied applications as garage floors, automobile motors, greasy and discolored sinks and bathtubs, mechanics' overalls, painted walls, and the human hands. In fact, it is effective as a cleaning agent for substantially all greasy surfaces.

It is also effective as an insecticide. For example, when it is sprayed or otherwise applied upon a flea-infested dog, it immediately kills all fleas with which it comes in contact, after which it can be removed readily and completely by flushing with water. Animal premises may be freed from small insects and parasites by similar treatment; so also can fruit trees and other plants. If desired, poisonous compounds which are soluble in kerosene, such, for example, as xylenols, naphthols, etc., may be added to my liquid composition to extend its range of usefulness.

A further usefulness for my liquid composition is as a lubricant in metal-working operations. By virtue of its kerosene content, it wets the metal readily, clings to the metal, and exerts a lubricating effect. Due to its ready miscibility with water, it can be removed from the metal quickly and completely, without prolonged wiping or the application of expensive solvents. When diluted with water, it is useful as a cutting oil, or combined lubricant and coolant, in metal-machining operations.

Other uses for my liquid composition, following from the above described combination of characteristics, will be evident.

While I have described in detail one method of making my liquid composition, I wish it to be understood that my invention is not limited to such specific details, and that the appended claims are to be given a breadth of interpretation commensurate with the advance in the art which my invention represents.

Having thus fully described the invention, what is claimed as new, and for which it is desired to secure Letters Patent, is:

1. A soluble oil in the form of a clear, homogeneous, stable liquid consisting of a major proportion of kerosene, a minor proportion of water, an alkali metal resinate and free fatty acid of the soap forming type.

2. A soluble oil in the form of a clear, homogeneous, stable liquid consisting of a major proportion of kerosene, a minor proportion of water, an alkali metal resinate and free oleic acid.

3. A soluble oil in the form of a clear, homogeneous, stable liquid consisting of a major proportion of kerosene, a minor proportion of water, sodium resinate and free oleic acid.

CLEMENT L. PERKINS.